United States Patent
Falke et al.

(10) Patent No.: US 6,638,986 B2
(45) Date of Patent: *Oct. 28, 2003

(54) PREPARATION OF IN SITU-RETICULATED FLEXIBLE POLYURETHANE FOAMS

(75) Inventors: Peter Falke, Schwarzheide (DE); Heinz-Dieter Lutter, Diepholz (DE); Michael J. Pcolinski, Bloomfield, MI (US)

(73) Assignee: BASF Aktiengesellschaft, Ludwigshafen (DE)

( * ) Notice: Subject to any disclaimer, the term of this patent is extended or adjusted under 35 U.S.C. 154(b) by 17 days.

This patent is subject to a terminal disclaimer.

(21) Appl. No.: 10/047,639

(22) Filed: Jan. 15, 2002

(65) Prior Publication Data

US 2002/0165290 A1 Nov. 7, 2002

(30) Foreign Application Priority Data

Feb. 6, 2001 (DE) .......................... 101 05 558

(51) Int. Cl.$^7$ .............................................. C08G 18/14
(52) U.S. Cl. ........................ 521/110; 521/112; 521/130; 521/159; 521/170; 521/174
(58) Field of Search ............................. 521/110, 112, 521/130, 159, 170, 174

(56) References Cited

U.S. PATENT DOCUMENTS

| | | | | |
|---|---|---|---|---|
| 5,306,737 A | * | 4/1994 | Burkhart et al. | 521/112 |
| 5,369,138 A | * | 11/1994 | Gansen | 521/159 |
| 5,420,170 A | * | 5/1995 | Lutter et al. | 252/182.24 |
| 5,521,226 A | * | 5/1996 | Bleys | 521/137 |
| 5,594,097 A | * | 1/1997 | Chaffanjon et al. | 252/182.27 |
| 5,686,502 A | * | 11/1997 | Murray et al. | 521/130 |
| 5,863,961 A | * | 1/1999 | Jacobs et al. | 521/174 |
| 6,156,864 A | * | 12/2000 | Ohkubo et al. | 521/159 |
| 6,239,186 B1 | * | 5/2001 | Mansfield et al. | 521/112 |
| 6,245,825 B1 | * | 6/2001 | Bleys | 521/137 |
| 6,322,722 B1 | * | 11/2001 | Bhattacharjee et al. | 252/182.24 |
| 6,391,933 B1 | * | 5/2002 | Mattesky | 521/114 |
| 6,417,241 B1 | * | 7/2002 | Huygens et al. | 521/130 |

* cited by examiner

*Primary Examiner*—John M. Cooney, Jr.
(74) *Attorney, Agent, or Firm*—Fernando A. Borrego

(57) ABSTRACT

Reticulated flexible polyurethane foams are prepared by reacting organic and/or modified organic polyisocyanates (a) with a polyetherol mixture (b) and, if required, further compounds (c) having hydrogen atoms reactive toward isocyanates, in the presence of water and/or other blowing agents (d), catalysts (e) and further assistants and additives (f), by a process in which the polyetherol mixture (b) comprises b1) at least one difunctional or polyfunctional polyetherol having an OH number of from 20 to 150 mg KOH/g, based on propylene oxide and/or butylene oxide and ethylene oxide and having an ethylene oxide content of more than 40% by weight, based on the total amount of alkylene oxide used, (b1.1) and, if required, further difunctional or polyfunctional polyetherols having an OH number of from 20 to 150 mg KOH/g, based on propylene oxide and/or butylene oxide and ethylene oxide and having an ethylene oxide content of not more than 40% by weight, based on the total amount of alkylene oxide used, which have a content of primary OH groups of more than 40%, (b1.2), with total amounts of the component (b1) of at least 70% by weight, based on the total weight of the component (b), (b1.1) being present in amounts of at least 50% by weight, based on the total weight of the component (b), and b2) at least one difunctional or polyfunctional polyetherol based on propylene oxide and/or butylene oxide and having an OH number of more than 25 mg KOH/g, in amounts of not more than 30% by weight, based on the total weight of the component (b), and silicone stabilizers are used in amounts of from 0.02 to 5% by weight, based on the total weight of the components (b) to f). The reticulated flexible polyurethane foams themselves prepared in this manner are used for upholstery purposes, for cavity filling and as support medium and filter medium.

14 Claims, 1 Drawing Sheet

Figure 1)
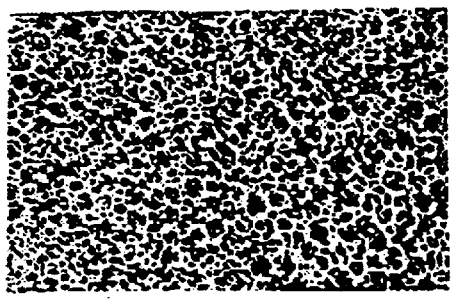
Figure 2)
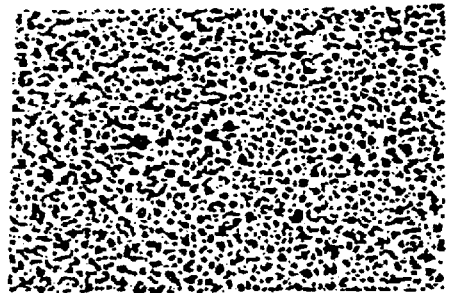
Figure 3)
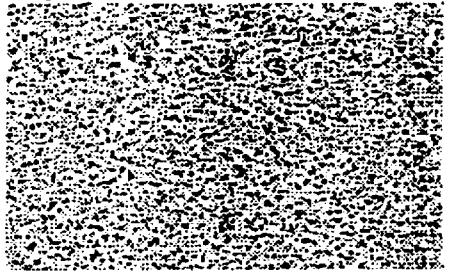
Figure 4)
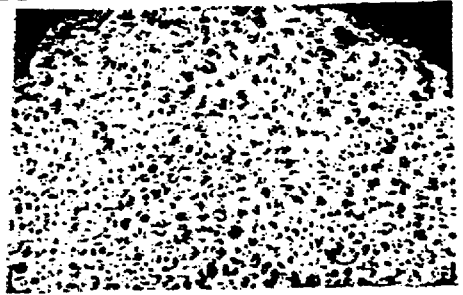

PREPARATION OF IN SITU-RETICULATED FLEXIBLE POLYURETHANE FOAMS

The present invention relates to a process for the preparation of in situ-reticulated flexible polyurethane foams by reacting organic and/or modified organic polyisocyanates (a) with a special polyetherol mixture (b) and, if required, further compounds (c) having hydrogen atoms reactive toward isocyanates, in the presence of water and/or other blowing agents (d), catalysts (e) and further assistants and additives (f) with the use of silicone stabilizers.

The preparation of flexible polyurethane foams by reacting organic and/or modified organic polyisocyanates or prepolymers with compounds having a higher functionality and at least two reactive hydrogen atoms, for example polyoxyalkylenepolyamines and/or preferably organic polyhydroxy compounds, in particular polyetherols, having molecular weights of from 300 to 6000, and, if required, chain extenders and/or crosslinking agents having molecular weights of up to about 400 in the presence of catalysts, blowing agents, stabilizers, assistants and/or additives is known and has been widely described. A review of the preparation of flexible polyurethane foams is given, for example, in Kunststoff-Handbuch, Volume VII, Polyurethane, 1st Edition 1966, edited by Dr. R. Vieweg and Dr. A. Höchtlen, and 2nd Edition, 1983, and 3rd Edition, 1993, each edited by Dr. G. Oertel (Carl Hanser Verlag, Munich).

A number of industrial processes are known for the production of extremely open-cell flexible foams, i.e. reticulated flexible foams. According to Uhlig's Polyurethantaschenbuch, Hanser-Verlag, 1998, page 91, an aftertreatment of the foam with aqueous alkali solutions or a dry treatment by the Chemotronics process (destruction of the cell membranes by an oxyhydrogen explosion) may be chosen for this purpose.

U.S. Pat. No. 3,325,338 discloses reticulated ester foams. Here, the cell walls are removed by treatment in an alkaline medium. U.S. Pat. No. 5,567,740 describes a reticulated conductive flexible foam which is used as tank foam. The foam is reticulated by exposing it briefly to a flame front. U.S. Pat. No. 3,171,820 describes a process in which the cell walls of a polyurethane foam are removed by a hydrolysis process. Reticulated foams having a roughened surface are produced thereby. WO-A-8809350 is concerned with the preparation of a tank foam. This conductive foam is reticulated by the brief application of high temperatures after the actual foam preparation. DE-A-19741646 claims hydrophilic ester foams which can be reticulated by an appropriate aftertreatment.

DE-A-4420168 describes an apparatus for controlling the number of cells. In fact, a specific gas loading of the components which is intended to influence the cell size is realized. JP 11116717 describes a spongy polyurethane foam which is used, for example, as a cleaning sponge. In this case too, a considerable amount of additional air is incorporated into the polyol mixture. According to EP-A-930323, a polyurethane material is extruded with the action of a gas, a reticulated material being said to form. GB 2267840 describes in particular the use of a reticulated foam as a filter. Hydrophilic foams are used in order also to ensure an exchange of moisture. The pore size is from 0.1 to 1 mm.

In U.S. Pat. No. 3,884,848, small amounts of ester components are used, these having long carbon chains. In addition, polyetherol components are present in amounts of less than 10%. The existing incompatibility of the components is supported by a silicone stabilizer, with the result that open-cell foams can be produced. U.S. Pat. No. 4,160,076 mentions hydrophilic reticulated foams. The reticulation process is achieved in this case by a special combination of a nonionic surfactant and a liquid antifoam. In an analogous manner, U.S. Pat. No. 3,748,288 claims a polyester foam which contains small amounts of a polyetherol and amounts of a stabilizing silicone in addition to a silicone antifoam.

WO-A-9850446 describes flexible foams without cell membranes. These membrane-free foams are produced by means of special cell openers (silicone oil) which have an antifoam effect. This process is technically difficult to master since extreme foam problems can occur in the event of metering errors. In CA-A-797893, petroleum contents are said to lead to an open cell character. In U.S. Pat. No. 4,670,477, reticulated polyester foams are protected. Here, the reticulation process is attributable to the presence of small amounts of a graft polyetherol. GB 707412 describes ester foams having reticulated character. The cell opening is realized here by means of relatively long-chain polyethylene glycol components. U.S. Pat. Nos. 4,670,477 and 4,656,196 claim ester slabstock foams which contain up to 20% of a polyoxypropylene polyol or a random polyetheralcohol, graft polyetherols necessarily being used. The use of a silicone stabilizer usually used for ether foams was advantageous. According to EP-A-459622, polyethylene glycols having a low molecular weight are used as cell openers. In combination with a high molecular weight trifunctional polyetherol based on propylene oxide and ethylene oxide, reticulated foams are obtained.

CH 1354576 claims a hydrophilic foam. This is produced using a main polyol having a high ethylene oxide content and containing relatively small amounts of a propoxylated high molecular weight polyetherol. The reticulated structure is obtained by adding cell destroyers, in this case a combination of cellulose materials and in particular a silicone antifoam. In DE-A-2919372 and U.S. Pat. No. 4,259,452, a special polyol mixture consisting of a polyethylene oxide/propylene oxide-polyol comprising from 51 to 98% of ethylene oxide and a further polyethylene oxide/propylene oxide polyol having a propylene oxide content of >51% is foamed in order to obtain very open-cell foams. To ensure the reliability of the process (freedom from tears), urea is added. The water used as a blowing agent must be employed in an amount of at least 4.5 parts in order to obtain satisfactory foams. Since, in the case of the polyols used, the ethylene oxide is generally incorporated randomly, strong tin catalysts are required in order to produce a specific foam stability. It is strongly advisable to effect foaming at relatively low temperatures since the viscosity is then higher, which is to be regarded as a precondition for cell opening. This procedure is of course technologically disadvantageous. Here, the cell opening is controlled by the use of different silicone stabilizers. Thus, coarse-cell foams are obtained using stabilizers of low activity (cold-cured foam) whereas very fine-cell foams form using silicone stabilizers of high activity (hot-cured foam). In a continuation of the invention, reticulated tank foams are presented in DE-A-2038789 and GB-A-2038739. Carboxylic acids and carboxylic anhydrides are mentioned as additives—evidently in order to improve the conductivity.

U.S. Pat. No. 3,890,254 describes reticulated flexible foams which are prepared by foaming hydrophilic prepolymers using a large excess of water in the presence of a surfactant. As a result of the preparation process, the foam has a very irregular pore structure.

U.S. Pat. No. 4,052,346 discloses reticulated flexible foams based on polyesteralcohols. Antifoams, e.g.

polydimethylsiloxane, are used for cell opening. Owing to the preparation method, this process is sensitive to process variations. U.S. Pat. No. 4,314,034 claims reticulated foams having high stability under damp/warm conditions. For this purpose, a hydrophilic prepolymer is reacted, the polyol component containing fibres or preferably diatomaceous earth.

DE-A-2454049 describes membrane-free open-cell flexible foams which are prepared using cell-opening fatty esters. DE-A-2210721 produces membrane-free flexible foams by using hydrophobic organosilicon compounds.

The inventions mentioned in the prior art certainly permit the preparation of open-cell or reticulated flexible foams, there being considerable potential for improvement with regard to the properties and the processibility in the case of this class of substance.

It is an object of the present invention to provide reticulated, easily processible flexible polyurethane foams using both tolylene diisocyanate (TDI) and in particular diphenylmethane diisocyanate (MDI) derivatives, it being intended to control the pore size by the chemistry of the polyurethane production. Subsequent pore opening should not be necessary.

We have found, surprisingly, that this object is achieved if a special polyol combination (b) comprising at least one difunctional or polyfunctional polyetherol having an OH number of from 20 to 150 mg KOH/g, based on propylene oxide and/or butylene oxide and ethylene oxide and having an ethylene oxide content of more than 40% by weight, based on the total amount of alkylene oxide used, and, if required, further difunctional or polyfunctional polyetherols having an OH number of from 20 to 150 mg KOH/g, based on propylene oxide and/or butylene oxide and ethylene oxide and having an ethylene oxide content of not more than 40% by weight, based on the total amount of alkylene oxide used, which have a content of primary OH groups of more than 40%, in defined amounts, and at least one difunctional or polyfunctional polyetherol based on propylene oxide and/or butylene oxide and having an OH number of more than 25 mg KOH/g, in defined amounts, is used and silicone stabilizers are used in amounts of from 0.02 to 5.0% by weight.

The present invention accordingly relates to a process for the preparation of reticulated flexible polyurethane foams by reacting organic and/or modified organic polyisocyanates (a) with a polyetherol mixture (b) and, if required, further compounds (c) having hydrogen atoms reactive toward isocyanates, in the presence of water and/or other blowing agents (d), catalysts (e) and further assistants and additives (f), wherein the polyetherol mixture (b) comprises b1) at least one difunctional or polyfunctional polyetherol having an OH number of from 20 to 150 mg KOH/g, based on propylene oxide and/or butylene oxide and ethylene oxide and having an ethylene oxide content of more than 40% by weight, based on the total amount of alkylene oxide used, (b1.1) and, if required, further difunctional or polyfunctional polyetherols having an OH number of from 20 to 150 mg KOH/g, based on propylene oxide and/or butylene oxide and ethylene oxide and having an ethylene oxide content of not more than 40% by weight, based on the total amount of alkylene oxide used, which have a content of primary OH groups of more than 40%, (b1.2), with total amounts of the component (b1) of at least 70% by weight, based on the total weight of the component (b), (b1.1) being present in amounts of at least 50% by weight, based on the total weight of the component (b), and 2) at least one difunctional or polyfunctional polyetherol based on propylene oxide and/or butylene oxide and having an OH number of more than 25 mg KOH/g, in amounts of not more than 30% by weight, based on the total weight of the component (b)

and silicone stabilizers are used in amounts of from 0.02 to 5% by weight, based on the total weight of the components (b) to (f).

The present invention furthermore relates to the reticulated flexible polyurethane foams themselves which are prepared in this manner and their use for upholstery purposes, for cavity filling and as a support medium and filter medium.

In our investigations, we surprisingly found that the use of the novel combination of the polyetherols (b) in association with the use of the described amounts of silicone stabilizers results in a flexible foam which preferably has membrane-free pores in the foaming direction so that a subsequent reticulation process is no longer required. A person skilled in the art would actually have expected that, with a reduction in the amounts of silicone stabilizer, the foam would collapse or extremely irregularly shaped cells would form.

Regarding the components to be used according to the invention in the polyol mixture, the following may be stated:

The component (b1) consists of at least one difunctional or polyfunctional polyetherol having an OH number of from 20 to 150, preferably from 30 to 80, mg KOH/g, based on propylene oxide and/or butylene oxide and ethylene oxide and having an ethylene oxide content of more than 40, preferably more than 60, % by weight, based in each case on the total amount of alkylene oxide used (b1.1).

In addition to the polyetherols (b1.1), further difunctional or polyfunctional polyetherols based on propylene oxide and/or butylene oxide and ethylene oxide, having an OH number of from 20 to 150, preferably from 30 to 80, mg KOH/g and having an ethylene oxide content of not more than 40% by weight, based on the total amount of alkylene oxide used, and an amount of primary OH groups of more than 40%, preferably more than 70%, (b1.2) may be contained in the component (b1).

For example, polyetherols based on ethylene glycol, glycerol or trimethylpropane as an initiator and having an ethylene oxide terminal block or with random incorporation of the ethylene oxide are suitable as (b1.1) and (b1.2). Polyetherols based on glycerol and having an ethylene oxide endcap are preferably used.

An advantageously used component (b1.1) is a polyetherol which, in a mixture of 99 parts by weight of this polyol (b1.1) and 1 part by weight of water, with the addition of the silicone stabilizer, reaches a surface tension of more than 25 mN/m, it of course being necessary to ensure foamability.

According to the invention, the polyetherols (b1) are used in total amounts of at least 70, preferably from 70 to 90, % by weight, based in each case on the total weight of the component (b). The amount of component (b1.1) is at least 50, preferably more than 65, % by weight, based in each case on the total weight of the component (b).

The component (b2) consists of at least one difunctional or polyfunctional polyetherol based on propylene oxide and/or butylene oxide and having an OH number of more than 25, preferably more than 45, mg KOH/g.

For example, the following are suitable for this purpose as (b2): polyetherols, based on propylene glycol, glycerol, tolylenediamine and sorbitol and propylene oxide. Polypropylene glycols are preferably used.

According to the invention, the polyetherols (b2) are used in amounts of not more than 30, preferably less than 20, in particular from 5 to 18, % by weight, based in each case on the total weight of the component (b).

Said polyetherols are prepared by known processes, as described by way of example further below.

In addition to the polyols of component (b), silicone-based foam stabilizers are used in amounts of from 0.02 to 5, preferably from 0.1 to 1, in particular from 0.1 to 0.6, % by weight, based in each case on the total weight of the components (b) to (f), for achieving the result according to the invention.

The amount of the stabilizer depends on the polyetherol (b1.1) chosen and is such that, in a mixture of 99 parts by weight of the component (b1.1) and 1 part by weight of water, a surface tension of more than 25 mN/m is established in this mixture by adding the silicone stabilizer (critial stabilizer test). Reducing the amount of stabilizer results in an increase in the cell diameter.

The foam stabilizers used are in particular hydrophilic silicone stabilizers. The novel silicone stabilizers are suitable for producing a surface tension of more than 25 mN/m in a mixture of 99 parts by weight of the polyol (b1.1) and 1 part by weight of water with addition of these stabilizers. In silicone stabilizers, polyether side chains are grafted on a siloxane chain. DE 4444898 and DE 19735488 describe, for example, the principle of the preparation process of silicone stabilizers. For the use according to the invention, the preferably used stabilizers have hydrophilic polyether side chains which frequently carry OH groups at least proportionately.

Examples of suitable silicone stabilizers are the products DC 198 from Air Products and B 8409 and B 8418 from Goldschmidt.

Regarding the further starting components which may be used, the following may be stated specifically:

Suitable organic polyisocyanates (a) for the preparation of the novel polyurethanes are the aliphatic, cycloaliphatic, araliphatic and preferably aromatic polyfunctional isocyanates known per se.

Specific examples are alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cylcoaliphatic diisocyanates, such as cyclohexane 1,3- and 1,4-diisocyanate and any desired mixtures of these isomers, 1-isocyanato-3,3,5-trimethyl-5-isocyanatomethylcyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably aromatic di- and polyisocyanates, e.g. tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic di- and polyisocyanates can be used individually or in the form of their mixtures.

Tolylene diisocyanate, mixtures of diphenylmethane diisocyanate isomers, mixtures of diphenylmethane diisocyanate and crude MDI or tolylene diisocyanate with diphenylmethane diisocyanate and/or crude MDI are preferably used. Mixtures containing more than 30% by weight of diphenylmethane 2,4'-diisocyanate are particularly preferably used.

Frequently, modified polyfunctional isocyanates, i.e. products which are obtained by reacting organic di- and/or polyisocyanates, are also used. Examples are di- and/or polyisocyanates containing ester, urea, biuret, allophanate, carbodiimide, isocyanurate, uretdione and/or urethane groups. Specific suitable examples are organic, preferably aromatic, polyisocyanates containing urethane groups and having NCO contents of from 43 to 15, preferably from 31 to 21, % by weight, based on the total weight, diphenylmethane 4,4'-diisocyanate modified by reaction, for example with low molecular weight diols, triols, dialkylene glycols, trialkylene glycols or polyoxyalkylene glycols having molecular weights of up to 6000, in particular up to 1 500, modified diphenylmethane 4,4'- and 2,4'-diisocyanate mixtures or modified crude MDI or tolylene 2,4- or 2,6-diisocyanate. The di- or polyoxyalkylene glycols may be used individually or as mixtures, examples being diethylene glycol, dipropylene glycol, polyoxyethylene, polyoxypropylene and polyoxypropylene polyoxyethylene glycols, -triols and/or -tetrols. Also suitable are NCO-containing prepolymers having NCO contents of from 25 to 3.5, preferably from 21 to 14, % by weight, based on the total weight, prepared from the polyesterpolyols and/or preferably polyetherpolyols described below and diphenylmethane 4,4'-diisocyanate, mixtures of diphenylmethane 2,4'- and 4,4'-diisocyanate, tolylene 2,4- and/or 2,6-diisocyanates or crude MDI. Liquid polyisocyanates containing carbodiimide groups and/or isocyanurate rings and having NCO contents of from 43 to 15, preferably from 31 to 21, % by weight, based on the total weight, for example based on diphenylmethane 4,4'-, 2,4'- and/or 2,2'-diisocyanate and/or tolylene 2,4- and/or 2,6-diisocyanate, have furthermore proven useful. The modified polyisocyanates can be mixed with one another or with unmodified organic polyisocyanates, e.g. diphenylmethane 2,4'- and 4,4'-diisocyanate, crude MDI, tolylene 2,4- and/or 2,6-diisocyanate.

Modified organic polyisocyanates which have proven particularly useful are NCO-containing prepolymers which are advantageously formed by reaction of at least parts of the components (a), (b) and, if required, (c) and/or (d), in particular those which contain the component (b1) at least proportionately.

In addition to the polyetherol mixture (b) described above and used according to the invention, further compounds (c) having hydrogen atoms reactive toward isocyanates can, if required, be added.

Compounds having at least two reactive hydrogen atoms are primarily suitable for this purpose. Those having a functionality of from 2 to 8, preferably from 2 to 3, and an average molecular weight of from 300 to 8000, preferably from 300 to 5000, are expediently used. The hydroxyl number of the polyhydroxy compounds is as a rule from 20 to 160, preferably from 28 to 56.

The polyetherpolyols used in the components (b) and (c) are prepared by known processes, for example by anionic polymerization with alkali metal hydroxides, e.g. sodium hydroxide, potassium hydroxide, or alkali metal alcoholates, e.g. sodium methylate, sodium ethylate, potassium ethylate or potassium isopropylate, as catalysts and with the addition of at least one initiator which contains from 2 to 8, preferably 2 or 3, bonded reactive hydrogen atoms per molecule, or by cationic polymerization with Lewis acids, such as antimony pentachloride, boron fluoride etherate, etc., or bleaching earth as catalyst or by double metal cyanide catalysis from one or more alkylene oxides having 2 to 4 carbon atoms in the alkylene radical. For specific intended uses, monofunctional initiators may also be incorporated into the polyether structure.

Suitable alkylene oxides are, for example, tetrahydrofuran, 1,3-propylene oxide, 1,2- and 2,3-butylene oxide, styrene oxide and preferably ethylene oxide and 1,2-propylene oxide. The alkylene oxides may be used individually, alternately in succession or as mixtures.

Examples of suitable initiator molecules are water, organic dicarboxylic acids, such as succinic acid, adipic acid, phthalic acid and terephthalic acid, aliphatic and aromatic, unsubstituted or N-monoalkyl-, N,N-dialkyl- and N,N'-dialkyl-substituted diamines having 1 to 4 carbon atoms in the alkyl radical, such as unsubstituted, monoalkyl-substituted and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane. Other suitable initiator molecules are alkanolamines, e.g. ethanolamine, N-methyl- and N-ethylethanolamine, dialkanolamines, e.g. diethanolamine, N-methyl- and N-ethyldiethanolamine, and trialkanolamines, e.g. triethanolamine, and ammonia. Polyhydric, in particular dihydric and/or trihydric, alcohols, such as ethanediol, 1,2- and 2,3-propanediol, diethylene glycol, dipropylene glycol, 1,4-butanediol, 1,6-hexanediol, glycerol, trimethylolpropane and pentaerythritol, are preferably used.

The polyetherpolyols, preferably polyoxypropylenepolyols and polyoxypropylenepolyoxyethylenepolyols, have a functionality of, preferably, from 2 to 8, in particular from 2 to 3, and molecular weights of from 300 to 8000, preferably from 300 to 6000, in particular from 1000 to 5000, and suitable polyoxytetramethylene glycols have a molecular weight of up to about 3500.

Other suitable polyetherpolyols are polymer-modified polyetherpolyols, preferably graft polyetherpolyols, in particular those based on styrene and/or acrylonitrile, which are prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyetherpolyols, analogously to German patents 1111394, 1222669 (U.S. Pat. Nos. 3,304,273, 3,383,351, 3,523,093), 1152536 (GB 1040452) and 1152537 (GB 987618), and polyetherpolyol dispersions which contain, as the disperse phase, usually in an amount of from 1 to 50, preferably from 2 to 25, % by weight, for example polyureas, polyhydrazides, polyurethanes containing bonded tert-amino groups and/or melamine, and which are described, for example, in EP-B-011752 (U.S. Pat. No. 4,304,708), U.S. Pat. No. 4,374,209 and DE-A-3231497.

The polyetherpolyols can be used individually or in the form of mixtures.

In addition to the polyetherpolyols described, for example, polyetherpolyamines and/or further polyols selected from the group consisting of the polyesterpolyols, polythioetherpolyols, polyesteramides, hydroxyl-containing polyacetals and hydroxyl-containing aliphatic polycarbonates or mixtures of at least two of said polyols may also be used in small amounts. However, preferably no further components are used.

The flexible polyurethane foams can be prepared in the presence or absence of chain extenders and/or crosslinking agents, although these are not required as a rule. Chain extenders and/or crosslinking agents used are diols and/or triols having molecular weights of less than 400, preferably from 60 to 300. For example, aliphatic, cycloaliphatic and/or araliphatic diols of 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, triethanolamine, diethanolamine, glycerol and trimethylolpropane, and low molecular weight hydroxyl-containing polyalkylene oxides based on ethylene oxide and/or 1,2-propylene oxide and the abovementioned diols and/or triols as initiator molecules are suitable.

If chain extenders, crosslinking agents or mixtures thereof are used for the preparation of the polyurethane foams, they are expediently used in an amount of up to 10% by weight, based on the weight of the polyol compounds.

The compounds of component (c) can be used individually or in the form of mixtures.

The blowing agent (d) used may be the chlorofluorocarbons (CFCs) and highly fluorinated and/or perfluorinated hydrocarbons generally known from polyurethane chemistry. However, the use of these substances is greatly restricted whilst being completely discontinued for ecological reasons. In addition to chlorofluorocarbons and fluorocarbons, in particular aliphatic and/or cycloaliphatic hydrocarbons, especially pentane or cyclohexane, or acetals, e.g. methylal, are possible alternative blowing agents. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of from about 5 to 30% by weight. Such products are sufficiently well known from plastics chemistry, e.g. EP-A-0351614. The amount of blowing agent or blowing agent mixture used is from 1 to 15, preferably from 1 to 10, % by weight, based in each case on the total weight of the components (b) to (d).

Furthermore, it is possible and usual for from 0.5 to 15, preferably from 1 to 5, % by weight, based on the total weight of the components (b) to (d), of water to be added as blowing agent to the polyol component. The addition of water can be effected in combination with the use of the other blowing agents described.

For the purposes of the present invention, water is preferably used as the blowing agent.

Catalysts (e) used for the preparation of the flexible polyurethane foams are in particular compounds which greatly accelerate the reaction of the reactive hydrogen atoms, in particular of hydroxyl-containing compounds of components (b), (c) and (d), with the organic, unmodified or modified polyisocyanates (a). Organometallic compounds, preferably organic tin compounds, such as tin(II) salts of organic carboxylic acids, e.g. tin(II) acetate, tin(II) octanoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, are suitable. The organometallic compounds are used alone or preferably in combination with strongly basic amines. Examples are amidines, such as 2,3-dimethyl-2,4,5,6-tetrahydropyrimidine, tertiary amines, such as triethylamine, tributylamine, dimethylbenzylamine, N-methyl-, N-ethyl- and N-cyclohexylmorpholine, N,N,N', N'-tetramethylethylenediamine, N,N,N',N'-tetramethylbutanediamine, N,N,N',N'-tetramethyl-1,6- hexanediamine, pentamethyldiethylenetriamine, tetramethyldiaminoethyl ether, bis(dimethylaminopropyl) urea, dimethylpiperazine, 1,2-dimethylimidazole, 1-azabicyclo[3.3.0]octane and preferaby 1,4-diazabicyclo [2.2.2]octane and aminoalkanol compounds, such as triethanolamine, triisopropanolamine, N-methyl- and N-ethyldiethanolamine and dimethylethanolamine.

Other suitable catalysts are tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxide, such as sodium hydroxide, alkali metal alcoholates, such as sodium methylate and potassium isopropylate, and alkali metal salts of long-chain fatty acids having 10 to 20 carbon atoms and, if required, OH side groups. From 0.001 to 5, in particular from 0.05 to 2, % by weight, based on the weight of the components (b) to (f) of catalyst or catalyst combination are preferably used.

If required, further assistants and/or additives (f) can be incorporated into the reaction mixture for the preparation of the novel flexible polyurethane foams. Examples are flameproofing agents, stabilizers, fillers, dyes, pigments and hydrolysis stabilizers and fungistatic and bacteriostatic substances.

Suitable flameproofing agents are, for example, tricresyl phosphate, tris(2-chloroethyl) phosphate, tris(2-chloropropyl) phosphate, tetrakis(2-chloroethyl)ethylene diphosphate, dimethyl methanephosphonate, diethyl diethanolaminomethylphosphonate and commercial halogen-containing polyol flameproofing agents. In addition to the abovementioned halogen-substituted phosphates, inorganic or organic flameproofing agents, such as red phosphorus, hydrated alumina, antimony trioxide, arsenic oxide, ammonium polyphosphate and calcium sulfate, expanded graphite or cyanuric acid derivatives, e.g. melamine, or mixtures of at least two flameproofing agents, e.g. ammonium polyphosphates and melamine and, if required, corn starch or ammonium polyphosphate, melamine and expanded graphite and/ or, if required, aromatic polyesters can also be used for flameproofing the polyisocyanate polyadducts. Additions of melamine have proven particularly effective. In general, it has proven expedient to use from 5 to 50, preferably from 5 to 25, parts by weight of said flameproofing agents per 100 parts by weight of the components (b) to (f).

Suitable surface-active substances are, for example, compounds which serve for supporting the homogenization of the starting material and may also be suitable for regulating the cell structure of the plastics. Examples are emulsifiers, such as sodium salts of castor oil sulfates or of fatty acids and salts of fatty acids with amines, for example of oleic acid with diethylamine, of stearic acid with diethanolamine and of ricinoleic acid with diethanolamine, salts of sulfonic acids, for example alkali metal or ammonium salts of dodecylbenzene- or dinaphthylmethanedisulfonic acid and ricinoleic acid, oxyethylated alkylphenols, oxyethylated fatty alcohols, liquid paraffins, castor oil esters or ricinoleic esters, Turkey red oil and peanut oil, and cell regulators, such as paraffins, fatty alcohols and dimethylpolysiloxanes.

According to the invention, foam stabilizers used are those based on silicone, in particular hydrophilic silicone stabilizers as described further above. In addition, other foam stabilizers customary in polyurethane chemistry can also be present in small amounts. Advantageously, however, no further foam stabilizers are used.

Fillers, in particular reinforcing fillers, are to be understood as meaning the conventional organic and inorganic fillers, reinforcing agents, weighting agents, agents for improving the abrasion behavior in surface coatings, coating materials, etc. which are known per se. Specific examples are inorganic fillers, such as silicate minerals, for example sheet silicates, such as antigorite, serpentine, hornblendes, amphiboles, chrysotile and talc, metal oxides, such as kaolin, aluminas, titanium oxides and iron oxides, metal salts, such as chalk, barite and inorganic pigments, such as calcium sulfide and zinc sulfide, and glass, etc. Kaolin (China clay), aluminum silicate and coprecipitates of barium sulfate and aluminum silicate and natural and synthetic fibrous minerals, such as wollastonite, metal fibers and in particular glass fibers of various lengths, which, if required, may be sized, are preferably used. Examples of suitable organic fillers are carbon, rosin, cyclopentadienyl resins, graft polymers and cellulose fibers, polyamide, polacrylonitrile, polyurethane and polyester fibers based on aromatic and/or aliphatic dicarboxylic esters and in particular carbon fibers. The inorganic and organic fillers may be used individually or as mixtures and are advantageously incorporated in the reaction mixture in amounts of from 0.5 to 50, preferably from 1 to 40, % by weight, based on the weight of the components (a) to (f), but the content of matts, nonwovens and woven fabrics of natural and synthetic fibers may reach values of up to 80.

Further information concerning the abovementioned other conventional assistants and additives appear in the technical literature, for example the monograph by J. H. Saunders and K. C. Frisch, High Polymers, Volume XVI, Polyurethanes, Parts 1 and 2, Interscience Publishers 1962 and 1964, or the above-cited Kunststoffhandbuch, Polyurethane, Volume VII, Hanser-Verlag Munich, Vienna, 1st to 3rd Editions.

For the preparation of the novel foams, the organic and/or modified organic polyisocyanates (a), the polyetherol mixture (b) and, if required, further compounds (c) having hydrogen atoms reactive toward isocyanates and further components (d) to (f) are reacted in amounts such that the ratio of the number equivalents of NCO groups of the polyisocyanates (a) to the sum of the reactive hydrogen atoms of the components (b) to (f) is from 0.7:1 to 1.25:1, preferably from 0.9:1 to 1.15:1.

Polyurethane foams obtained by the novel process are advantageously prepared by the one-shot method, for example with the aid of the high pressure or low pressure technique in open or closed molds, for example metallic molds. The continuous application of the reaction mixture to suitable belt lines for the production of slabstock foams is also customary.

It has proven particularly advantageous to employ the two-component process and to combine the components (b) to (f) to give a polyol component, often also referred to as component A, and to use the organic and/or modified organic polyisocyanates (a), particularly preferably an NCO prepolymer or mixtures of this prepolymer and further isocyanates and, if required, blowing agent (d) as the isocyanate component, often also referred to as component B.

The starting components are mixed at from 15 to 90° C., preferably from 20 to 60° C., in particular from 20 to 35° C., and introduced into the open mold or, if necessary under superatmospheric pressure, into the closed mold or, in the case of a continuous workstation, are applied to a belt which receives the reaction material. Mixing can be carried out mechanically by means of a stirrer, by means of a stirring screw or by high-pressure mixing in a nozzle. The mold temperature is expediently from 20 to 110° C., preferably from 30 to 60° C., in particular from 35 to 55° C.

The flexible polyurethane foams prepared by the novel process have a density of from 10 to 800, preferably from 30 to 100, in particular from 30 to 80, kg/m³. They have an extremely open-cell character, the foam skin having been virtually completely removed in particular in the foaming direction. They have a water absorptivity of, preferably, greater than 150%, in particular greater than 200%, the water absorptivity being calculated as follows:

Water absorptivity [%] = {[weight(1) − weight(2)]/weight(1)} × 100

Weight(1): Dry foam weight

Weight(2): Moist foam weight

In order to achieve the desired open-cell character, a mixture of the novel polyol (b1.1) and water (99/1 parts by weight) is mixed with a suitable amount of silicone stabilizer so that a surface tension greater than 25 mN/m is realized (critical stabilizer test). This amount of silicone stabilizer determined in this manner can be added as stabilizer to the actual polyol component, the desired degree of reticulation being achieved. A change in this surface tension to lower values and/or the use of polyols not according to the invention leads to fine-cell or closed-cell foams. A reduction in the cell size can be realized by increasing the amount of stabilizer.

The novel flexible polyurethane foams can be processed both as molded flexible foam and in particular as slabstock flexible foam. They are particularly suitable as upholstery material in the upholstered seating sector, for cavity filling and as a support medium and filter medium.

The examples which follow illustrate the invention without restricting it.

The table below shows the composition of the flexible foams reticulated in situ (freely foamed). The surface tension gives the value measured for the composition comprising polyol (b1.1), silicone stabilizer and water.

| Example | | 1 | 2 | 3 | 4 |
|---|---|---|---|---|---|
| Polyol (b1.1a) | pbw | | 79.2 | 78.9 | |
| Polyol (b1.1b) | pbw | | | | 76.6 |
| Polyol (b1.1c) | pbw | 78.15 | | | |
| Polyol (b1.2) | pbw | 2 | 2 | 2 | 4 |
| Polyol (b2) | pbw | 16 | 16 | 16 | 15 |
| Lupragen ® N 201 | pbw | 0.2 | 0.1 | 0.1 | 0.3 |
| Lupragen ® N 206 | pbw | 0.15 | 0.5 | 0.5 | 0.15 |
| Silicone stabilizer | pbw | 0.4 | 0.2 | 0.5 | 0.5 |
| Water | pbw | 3 | 2 | 2 | 2.5 |
| Lupranat ® M20A | pbw | 20 | 20 | | 20 |
| Lupranat ® T80 | pbw | 80 | 80 | | 80 |
| Lupranat ® MI | | | | 100 | |
| Surface tension | mN/m | 29.2 | 35.2 | 27.9 | n.d. |
| Water absorptivity | % | 220 | n.d. | n.d. | 224 |
| FIGURE | | 1 | 2 | 3 | 4 | pbw parts by weight
Polyol (b1.1a)-OH number 42 mg KOH/g, polyetheralcohol based on propylene oxide and ethylene oxide (72% by weight), glycerol initiator (BASF);
Polyol (b1.1b)-OH number 47 mg KOH/g, polyetheralcohol based on propylene oxide and ethylene oxide (75% by weight), glycerol initiator (BASF);
Polyol (b1.1c)-OH number 43 mg KOH/g, polyetheralcohol based on propylene oxide and ethylene oxide (72% by weight), ethylene glycol initiator;
Polyol (b1.2)-OH number 35 mg KOH/g, polyetheralcohol based on propylene oxide and ethylene oxide (13% by weight), glycerol initiator, content of primary OH groups 72% (BASF);
Polyol (b2)-OH number 55 mg KOH/g, polyetheralcohol based on propylene oxide, propylene glycol initiator (BASF);
Lupragen ® N 206-Amine catalyst (BASF);

Lupragen ® N 201-Amine catalyst (BASF);
Silicone stabilizer-DC 198 (Air Products);
Lupranat ® MI-NCO content 33.6% by weight, isomer mixture of 4,4'-MDI and 2,4'-MDI;
Lupranat ® M20A-NCO content 31.6% by weight, polyphenylenepolymethylene polyisocyanate;
Lupranat ® T80-NCO content 48.3% by weight, TDI 80/20.

BRIEF DESCRIPTION OF DRAWING

FIGS. 1–4 show cut cross-sections of the foam samples obtained in Examples 1–4, respectively.

We claim:

1. A process for the preparation of in situ-reticulated flexible polyurethane foams comprising reacting organic and/or modified organic polyisocyanates (a) with a polyetherol mixture (b) and, optionally, further compounds (c) having hydrogen atoms reactive toward isocyanates, in the presence of water and/or other blowing agents (d), catalysts (e) and further assistants and additives (f), wherein the polyetherol mixture (b) comprises (b1) at least one difunctional or polyfunctional polyetherol having an OH number of from 20 to 150 mg KOH/g, based on propylene oxide and/or butylene oxide and ethylene oxide and having an ethylene oxide content of more than 60% by weight, based on the total amount of alkylene oxide used, (b1.1) and optionally, further difunctional or polyfunctional polyetherols having an OH number of from 20 to 150 mg KOH/g, based on propylene oxide and/or butylene oxide and ethylene oxide and having an ethylene oxide content of not more than 40% by weight, based on the total amount of alkylene oxide used, which have a content of primary OH groups of more than 40%, (b1.2), with total amounts of the component (b1) of at least 70% by weight, based on the total weight of the component (b), (b1.1) being present in amounts of at least 50% by weight, based on the total weight of the component (b), and b2) at least one difunctional or polyfunctional polyetherol free of ethylene oxide and based on propylene oxide and/or butylene oxide and having an OH number of more than 25 mg KOH/g, in amounts of not more than 30% by weight, based on the total weight of the component (b), wherein the amount by weight of (b1) is greater than that of (b2) such that the weight ratio of (b1) to (b2) is from 2:1 to 40:1 and the foams incorporate silicone stabilizers in amounts of from 0.02 to 5% by weight, based on the total weight of the components (b) to (f).

2. A process as claimed in claim 1, wherein component (b1.1) comprises a polyol which, in a mixture of 99 parts by weight of this polyol (b1.1) and 1 part by weight of water, with the addition of the silicone stabilizer, has a surface tension of more than 25 mN/m.

3. A process as claimed in claim 1, wherein the component (b1) is used in amounts of from 70 to 90% by weight, based on the total weight of the component (b).

4. A process as claimed in claim 1, wherein the component (b1.1) is used in amounts of more than 65% by weight, based on the total weight of the component (b).

5. A process as claimed in claim 1, wherein the component (b2) is used in amounts of less than 20% by weight, based on the total weight of the component (b).

6. A process as claimed in claim 1, wherein the silicone stabilizer comprise hydrophilic silicone stabilizers.

7. A process as claimed in claim 1, wherein the silicone stabilizers are used in amounts of from 0.1 to 1% by weight, based on the total weight f the components (b) to (f).

8. A process as claimed in claim 1, wherein the amount of the silicone stabilizer is such that, in a mixture of 99 parts by weight of the component (b1.1) and 1 part by weight of water, the addition of the silicone stabilizer results in a surface tension of more than 25 nN/m in this mixture.

9. A process as claimed in claim 1, wherein the organic and/or modified organic polyisocyanates (a) comprise tolylene diisocyanate, mixtures of diphenylmethane diisocyanate isomers, mixtures of diphenylmethane diisocyanate and polyphenylpolymethylene polyisocyanate or tolylene diisocyanate with diphenylmethane diisocyanate and/or polyphenylpolymethylefle polyisocyanate.

10. A process as claimed in claim 1, wherein the organic and/or modified organic polyisocyanates (a) comprise NCO-containing prepolymers formed from the reaction of the isocyanates (a) with the polyetherols (b) and, optionally, the components (c) and/or (d).

11. A reticulated flexible polyurethane foam which is prepared in accordance with a process as claimed in any of claims 1 to 10.

12. A flexible polyurethane foam as claimed in claim 11, which has a water absorptivity of more than 150%.

13. A flexible polyurethane foam as claimed in claim 11, which is processed as a molded foam or as slabstock foam.

14. A process as claimed in claim 1 wherein the weight ratio of (b1) to (b2) is from 3:1 to 7:1.

* * * * *